E. W. BURGESS.
MOWING MACHINE.
APPLICATION FILED AUG. 23, 1916.
1,291,393.
Patented Jan. 14, 1919.
2 SHEETS—SHEET 2.
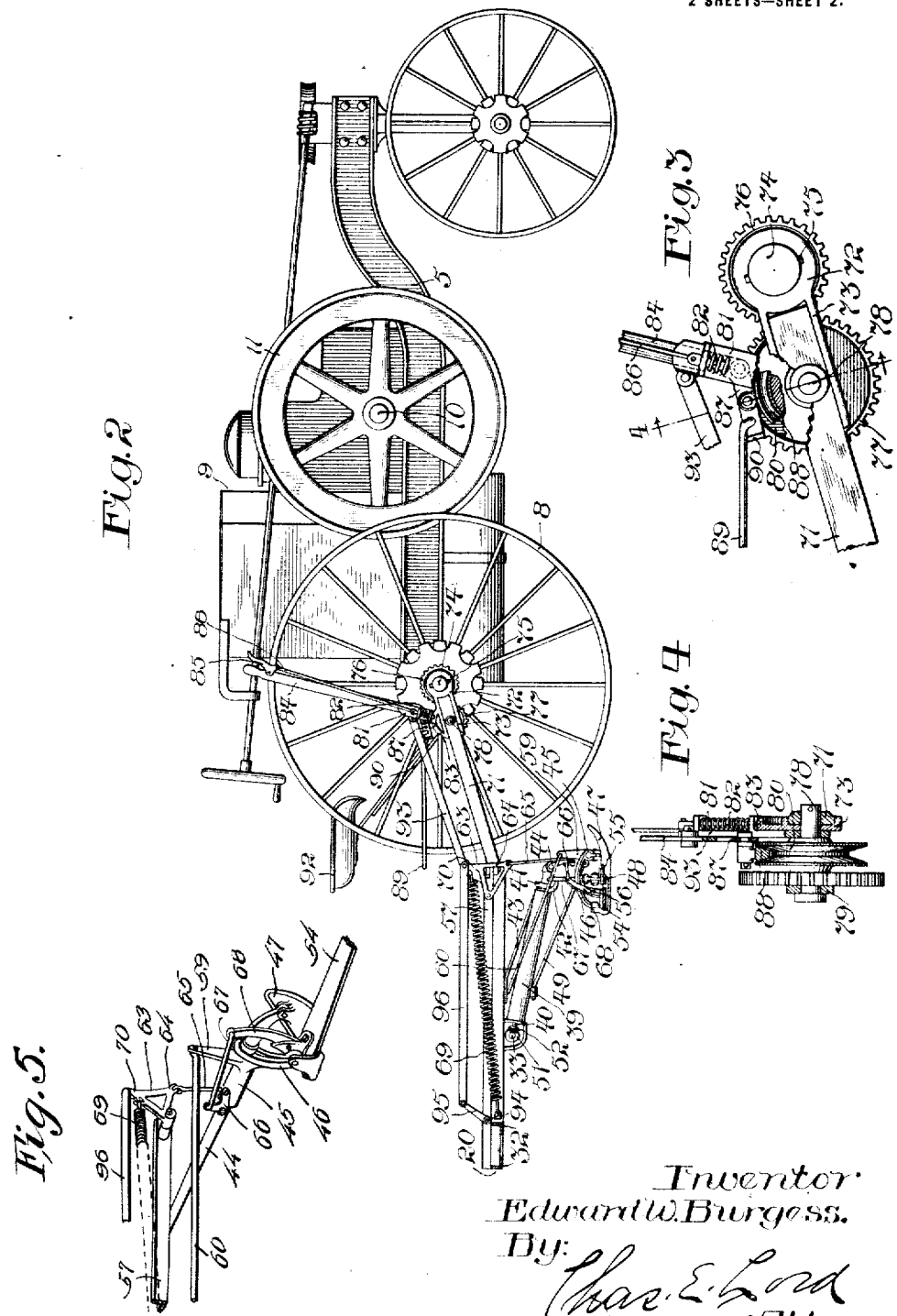
Inventor
Edward W. Burgess.
By
Chas. E. Lord
Atty.

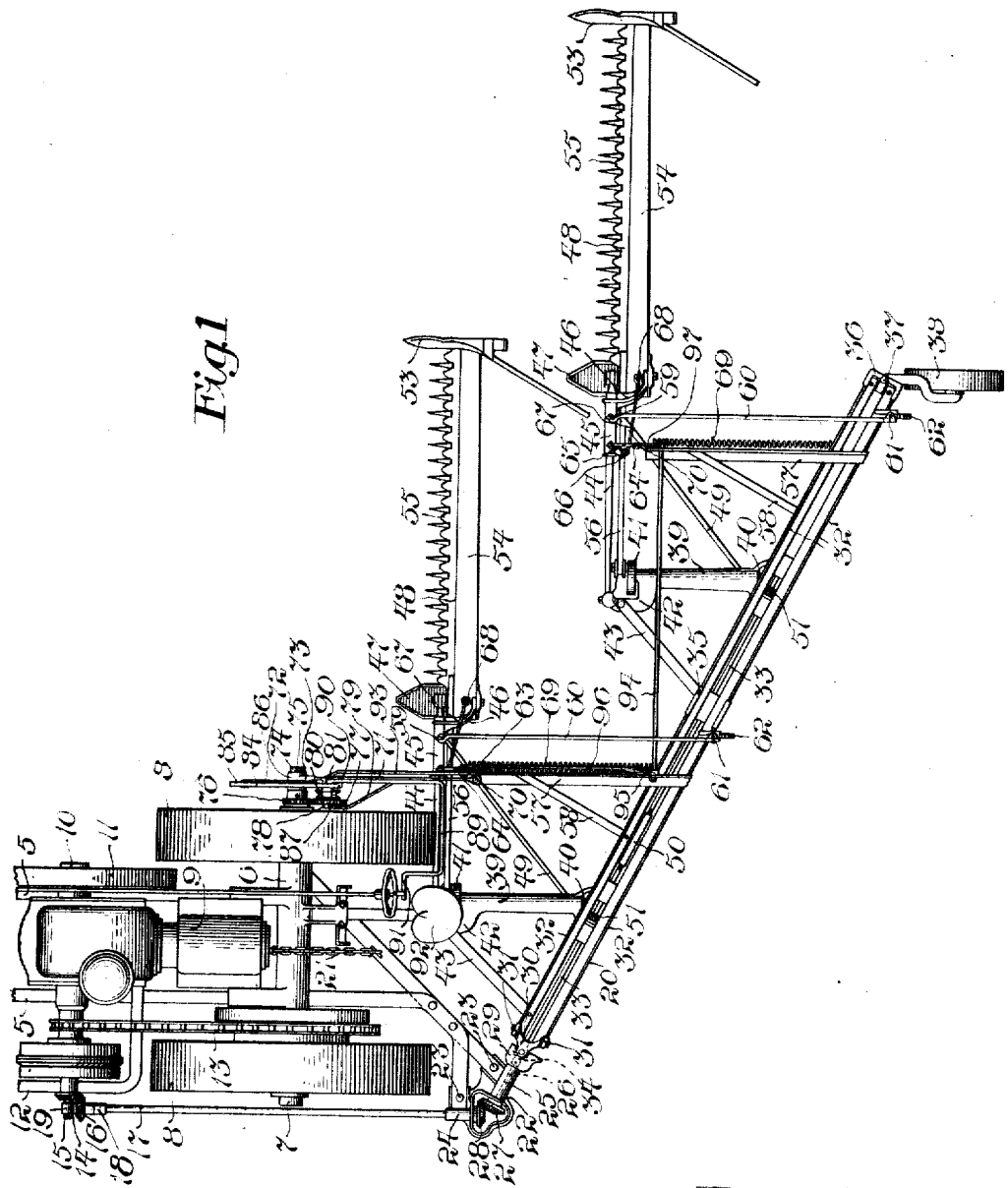

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

MOWING-MACHINE.

1,291,393.     Specification of Letters Patent.     Patented Jan. 14, 1919.

Application filed August 23, 1916. Serial No. 116,510.

*To all whom it may concern:*

Be it known that I, EDWARD W. BURGESS, a citizen of the United States, residing at Chicago, in the county of Cook and State of Illinois, have invented certain new and useful Improvements in Mowing-Machines, of which the following is a full, clear, and exact specification.

My invention relates to mowing machines, and in particular to a type of the class indicated adapted for tractor operation, wherein the machine may include a plurality of cutting units connected together in offset and trailing relation and coupled with a tractor in a manner to be propelled thereby, and having its operative parts driven by means of gear connections with the power transmission gearing of the tractor.

The object of the invention is to provide improved connections between the draw bar of a tractor and the tractor unit of a plurality of machines whereby the machines may be swung to a trailing position behind the tractor without disturbing the gear connections between the machines and the power transmission gearing of the tractor and to provide means whereby power derived from the tractor is made available to simultaneously adjust the coupling frames and finger bars of a plurality of cutting units in varying planes.

These objects are attained by means of the mechanism illustrated in the accompanying drawings, in which—

Figure 1 is a top plan view of a tractor and a mowing machine comprising two cutting units coupled together in offset and trailing relation and embodying my invention;

Fig. 2 is a side elevation of part of Fig. 1;

Fig. 3 is a side elevation on an enlarged scale of part of the finger bar adjusting mechanism;

Fig. 4 is a front sectional elevation of Fig. 3; and

Fig. 5 is a detail view in perspective illustrating the lever connections for lifting the coupling frame and finger bar.

The same reference characters designate like parts throughout the several views.

The tractor includes truck frame members 5, having secured to their rear ends a transversely disposed tubular frame member 6, in which is journaled an axle 7, having traction wheels 8 mounted upon its opposite ends.

The engine includes a power cylinder 9, engine shaft 10, fly wheel 11, power transmission gearing 12 connected with the axle 7 by means including a sprocket chain 13, 14 a pinion secured to the end of a countershaft 15, which is operatively connected with the power transmission gearing 12, 16 a pinion meshing with the pinion 14 and secured to the front end of a rearwardly extending side shaft 17, having its front end journaled in a bearing member 18 carried by an arm 19 turnable about the axis of the shaft 15.

20 represents a rearwardly and laterally extending draft frame supported by means of a chain 21. 22 represents a gear casing secured to the rear end of the draft frame 20 by means of bolts 23 and having integral therewith a bearing member 24, in which is journaled the rear end of the shaft 17. 25 a rearwardly and laterally inclined sleeve member integral with gear casing and in which is journaled a shaft 26, having secured to one end thereof a pinion 27 meshing with a corresponding pinion 28 secured to the rear end of the shaft 17. The sleeve 25 terminates at its grassward end in an enlarged bell-shaped member 29 provided with vertically disposed trunnion members 30 upon its upper and lower sides (only one being shown), on which are pivotally connected bracket members 31, that are secured to the ends of rearwardly inclined parallel machine frame members 22, spaced apart and having journaled in bearing boxes carried thereby a power shaft 33, having one end thereof operatively connected with the shaft 26 by means of a universal coupling 34 coaxially with the trunnion members 30 in a manner permitting the machine frame to turn about the axis of the trunnions without disturbing the gear connections between the machine and tractor.

A second machine unit or section includes like spaced frame members 32¹ connected in lineal relation with the grassward end of the members 32 by means of a joint plate 35, the grassward ends of the frame members 32¹ being secured to a bracket member 36, having the vertical stem of an arm 37 journaled therein, and upon which is mounted a caster wheel 38.

Secured to each machine frame section or unit are forwardly extending tubular frame members 39, having shafts 40 journaled therein and provided with crank wheels 41 at their front ends that are protected by the usual bowl members 42 integral with the tubular frame members and 43 represents rearwardly and laterally inclined brace members connecting the bowl members with the inclined main frame members.

The coupling frame includes a transversely disposed bar 44, having its stubbleward end pivotally connected with the bowl 42, and journaled upon its opposite end is a sleeve 45 integral with a yoke 46, to which is pivoted a shoe 47, having a finger bar 48 secured thereto. 49 represents a diagonally disposed push bar having its front end connected with the sleeve 45 and its rear end with the tubular frame member 39.

Each of the machine sections or units is provided with a power shaft 33, that are connected with each other by means of coupling sleeves 50, and secured thereto are pinions 51 meshing with corresponding pinions 52 secured to the rear ends of the shafts 40. 53 represents the outside shoes secured to the finger bars 48, 54 the usual swather boards connected therewith, and 55 the knives connected with the crank wheels 41 by means of pitmen 56. Each section is provided with a forwardly extending bar 57, having its rear end secured to the frame members 32 and supported laterally by means of a brace member 58. 59 represents a vertically disposed arm forming part of the sleeve 45, having the front end of a rod 60 connected therewith, the rear end of said rod being connected with a tilting lever 61 pivoted upon the frame of the machine and coöperating with a toothed sector 62 in a common way to control the operative angle of the finger bar. Mounted upon the front end of the bar 57 carried by the tractor unit of the machine is a bell crank lever 63, having one arm 64 thereof connected with the upper end of a link 65, having its lower end connected with one arm of a bell crank lever 66 pivotally mounted upon the sleeve 45, the remaining arm of the lever being operatively connected, by means of a link 67, with a vertically disposed arm 68 carried by the inner shoe 47, and 69 represents a counterbalancing spring having its rear end connected with the frame of the machine and its front end with the vertical arm 70 of the bell crank lever 63. 71 represents a draft member having its rear end pivotally connected with the front end of the bar 57 in a manner permitting it to be swung laterally, and its front end secured to a sleeve 72 provided with a bracket 73, in which is journaled the extended end 74 of the tractor axle 7, a pin 75 securing the sleeve upon the axle. Secured to the axle 7 is a pinion 76 meshing with a gear wheel 77 journaled upon a stud 78 carried by the sleeve 72 and supported by means of a brace member 79. Integral with the gear wheel 77 is a friction sheave 80. Pivotally mounted upon the stud 78 adjacent the sheave 80 is an arm 81 carrying a spring-pressed slidable detent 82 adapted to operatively engage with a common form of toothed sector 83 integral with the sleeve 72. Pivotally mounted upon the arm 81 is a hand lever 84, carrying upon its upper end a thumb lever 85 that is operatively connected, by means of a rod 86, with the detent 82. The hand lever 84 is provided at its lower end with a rearwardly extending arm 87, upon which is pivotally mounted a brake shoe 88 adapted to engage with the friction sheave 80 when the hand lever is pulled rearward by the operator. 89 represents a foot lever pivotally connected with the rear end of the arm 87 and engaging with a laterally turned portion 90 of the arm. The foot lever extends rearwardly from the arm 87 and is then turned laterally in rear of the traction wheel and provided with an arm 91 convenient to an operator's foot from the seat 92 of the tractor. The vertical arm 70 of the bell crank lever 63 is connected with the arm 81 by means of a bar 93, and the operative connections between the bell crank lever 63 and the finger bar 48 may be any preferred form.

In operation, when it is desired to raise the coupling frame and finger bar, as when turning at the corner of a field, the operator may manipulate either the foot lever 89 or the hand lever 84 in a direction to cause the brake shoe 88 to frictionally engage with the sheave 80, and as the lever is thrown rearward, by a slight constant pressure thereon, the arm 81 turns with the sheave, and, through its connection with the bell crank lever 63, raises the coupling frame and finger bar to a higher plane.

The frame bars 32 and 32¹ have their lengths determined by the length of the finger bars, and the sections or machine units are substantially duplicates of each other and two or more may be coupled together in operative relation. When two or more units are coupled together, the finger bar adjusting mechanism includes a transversely disposed rock shaft 94, having its opposite ends journaled in the bars 57 and provided with an arm 95 secured to its stubbleward end and having its free end connected with the arm 70 of the bell crank lever 63 by means of a bar 96. Secured to the grassward end of the rock shaft 94 is a bell crank lever 97 corresponding with the lever 63 and connected with the finger bar by like means and in a manner whereby, when the lever 63 is turned in a direction to raise the coupling frame and finger bar of the tractor unit, the same elements of a plurality of units are adjusted simultaneously therewith. In transporting the machine the pin 75 is removed and the sleeve 72 disconnected from the axle extension, and then, as the tractor moves forward, the machine will swing about the axis of the trunnions 30 to a trailing position. When the sleeve 72 and rod 71 are disconnected from the axle extension, the rod 93 is also disconnected from the lever 84.

Having shown and described one embodiment of my invention, I do not desire that it be limited to the specific details of the structure as illustrated, it being understood that changes may be made in the form, proportion and organization of its various parts without departing from the spirit of my invention as indicated in the appended claims.

What I claim as my invention, and desire to secure by Letters Patent, is:

1. In combination, a tractor having a power driven element, a mowing machine frame pivotally carried thereby, a rising and falling coupling frame, a finger bar pivotally connected with said coupling frame, means carried by said frame and operative to adjust said coupling frame and finger bar in varying planes, and operative manually controllable connections between said adjusting means and a power driven element of a tractor.

2. In combination, a tractor including propelling elements, a mowing machine operatively connected with said tractor and including a machine frame pivotally carried by said tractor frame, a rising and falling coupling frame carried by said machine frame, a finger bar pivotally connected with said coupling frame, means carried by said machine frame and operative to adjust said coupling frame and finger bar in varying planes, and operative manually controllable connections between said adjusting means and said tractor propelling elements.

3. In combination, a tractor including propelling elements, a mowing machine operatively connected with said tractor, said machine including a plurality of frames disposed in lineal relation, cutting units carried by said frames and disposed in offset relation, separate means carried by said frames and operative to adjust said cutting units in varying planes, means for operatively connecting said separate adjusting means, and operative manually controllable connections between one of said separate means and said tractor propelling elements.

4. In combination, a tractor including traction wheels and a draft frame, a mowing machine including a machine frame pivotally connected with said draft frame, a rising and falling coupling frame carried by said machine frame, a finger bar carried by said coupling frame, means carried by said machine frame and operative to adjust said coupling frame and finger bar in varying planes, a rotatable element turning with said traction wheels, and means controllable by the operator for connecting said rotatable element with said finger bar adjusting means.

5. In combination, a tractor including traction wheels and a draft frame, a mowing machine including a machine frame connected with said draft frame, a rising and falling coupling frame connected with said machine frame, a finger bar carried by said coupling frame, a supplemental draft connection between said machine frame and said tractor, an adjusting lever mounted upon said machine frame and operatively connected with said coupling frame and finger bar, a rotatable element mounted upon said supplemental draft connection and turning with said traction wheels, an arm pivoted coaxially with said rotatable element, a link connection between said arm and said adjusting lever, and a hand lever carried by said arm and adapted to connect it with said rotatable element.

6. In combination, a tractor including traction wheels, an axle and a draft frame, a mowing machine including a machine frame having one end thereof carried by said draft frame, a rising and falling coupling frame connected with said machine frame, a finger bar carried by said coupling frame, a draft connection between said machine frame and said tractor axle, an adjusting lever mounted upon said machine frame and operatively connected with said coupling frame and finger bar, a pinion rotatable with said traction wheels, a gear wheel meshing with said pinion, a friction sheave rotatable with said gear wheel, an arm turnable about the axis of said sheave, a link connection between said arm and said adjusting lever, a hand lever pivoted upon said arm, and a brake shoe carried by said hand lever for engaging said friction sheave.

7. In combination, a tractor including traction wheels, an axle and a draft frame, a mowing machine including a machine frame having one end thereof carried by said draft frame, a rising and falling coupling frame connected with said machine frame, a finger bar carried by said coupling frame, a draft connection between said machine frame and said tractor axle, an adjusting lever mounted upon said machine frame and operatively connected to said coupling frame and finger bar, a pinion rotatable with said traction wheels, a gear wheel carried by said draft connection and meshing with said pinion, a friction sheave rotatable with said gear wheel, an arm turnable about the axis of said sheave, a detent carried by said arm, a toothed sector carried by said draft connection and located in the path of said detent, a hand lever pivotally mounted upon said arm, a brake shoe carried by said hand lever for engaging said sheave, and a bar connecting said arm with said adjusting lever.

8. In combination, a tractor including traction wheels, an axle and a draft frame, a mowing machine including a machine frame having one end thereof carried by said draft frame, a rising and falling coupling frame connected with said machine frame, a finger bar carried by said coupling frame, a draft connection between said machine frame and said tractor axle, an adjusting lever mounted upon said machine frame and operatively connected to said coupling frame and finger bar, a pinion rotatable with said traction wheels, a gear wheel carried by said draft connection and meshing with said pinion, a friction sheave rotatable with said gear wheel, an arm turnable about the axis of said sheave, a detent carried by said arm, a toothed sector carried by said draft connection and located in the path of said detent, a hand lever pivotally mounted upon said arm, a brake shoe carried by said hand lever for engaging said sheave, a foot lever carried by said hand lever and adapted to coöperate therewith, and a bar connecting said arm with said adjusting lever.

9. In combination, a tractor including traction wheels, a draft frame and an axle, a mowing machine including a machine frame having one end thereof carried by said draft frame, a rising and falling coupling frame carried by said machine frame, a finger bar carried by said coupling frame, a draft bar having its rear end pivotally connected with said machine frame and its front end detachably connected with said tractor axle, an adjusting lever mounted upon said machine frame and operatively connected with said coupling frame and said finger bar, a pinion secured to said axle, a gear wheel mounted upon said draft bar and meshing with said pinion, a friction sheave rotatable with said gear wheel, an arm turnable about the axis of said sheave, a detent carried by said arm, a toothed sector located in the path of said detent, a hand lever pivotally mounted upon said arm, a brake shoe carried by said hand lever for engaging said sheave, a foot lever operatively connected with said hand lever, and a bar connecting said arm with said adjusting lever.

10. In combination, a tractor including traction wheels, a draft frame, an engine including power transmission gearing operatively connected with said traction wheels, a longitudinally disposed shaft operatively connected with said power transmission gearing, a gear case secured to said draft frame, a shaft journaled in said gear case and having one end thereof operatively connected with said longitudinally disposed shaft, a mowing machine including a machine frame, said machine frame being pivotally connected with said gear case, and a power shaft journaled upon said machine frame and operatively connected with the opposite end of said shaft journaled in said gear case.

11. In combination, a tractor including traction wheels, a draft frame, an engine including power transmission gearing operatively connected with said traction wheels, a longitudinally disposed shaft operatively connected with said power transmission gearing, a gear case secured to said draft frame and including a rearwardly and laterally inclined sleeve, a shaft journaled in said sleeve and having one end thereof operatively connected with the rear end of said longitudinally disposed shaft, a mowing machine including a machine frame, said machine frame being pivotally connected with said sleeve, a power shaft journaled upon said said machine frame, and a universal coupling connecting said power shaft with said gear case shaft coaxially with the pivotal connection of said sleeve with said machine frame.

12. In combination, a tractor including a source of power, a frame pivotally carried thereby, a plurality of mower units carried by said frame, and means operatively connected to said source of power for vertically adjusting said mower units.

13. In combination, a tractor including a draft frame and a source of power, a frame pivotally connected to said draft frame and disposed in rear of the tractor, a plurality of mower units carried by said frame, and means operatively connected with said source of power for adjusting said mower units.

14. In combination, a tractor including a draft frame and a source of power, a frame pivotally connected to said draft frame and extending to the rear thereof, a plurality of detachable mower units carried by said frame, a power transmitting shaft carried by said pivotally mounted frame and operatively connected to said source of power, means connecting said power transmitting shaft with the cutting apparatus of said mower, and means operatively connected with said source of power for adjusting said mower units.

15. In combination, a tractor including a draft frame and a source of power, a frame pivotally connected to said draft frame at the rear end thereof and disposed diagonally with respect to the line of draft, a plurality of mower units carried by said frame and each including a rising and falling coupling frame and a finger bar pivotally connected with said coupling frame, means carried by said pivotally mounted frame for adjusting said coupling frame and finger bar in varying planes, and operative connections between said adjusting means and said source of power.

In testimony whereof I affix my signature.

EDWARD W. BURGESS.

Copies of this patent may be obtained for five cents each, by addressing the "Commissioner of Patents, Washington, D. C."